S. J. PARDESSUS.
Ventilator-Cap.
No. 222,939. Patented Dec. 23, 1879.
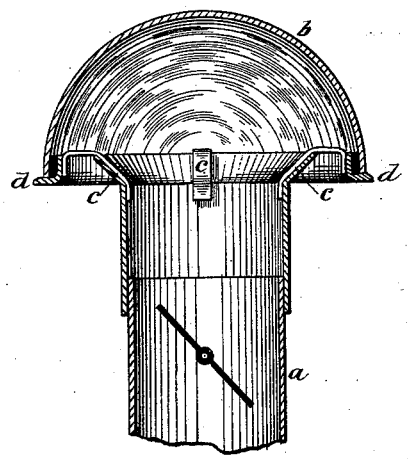
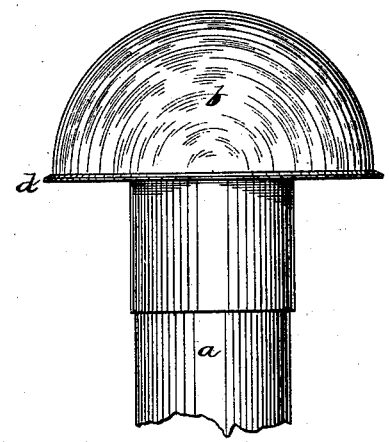
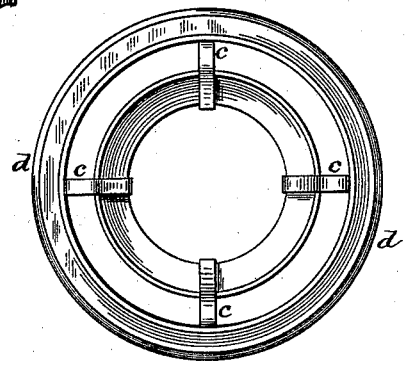
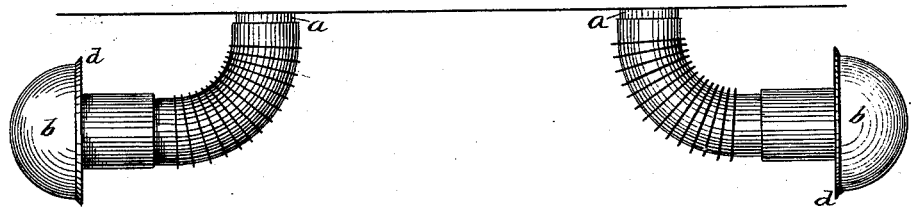

UNITED STATES PATENT OFFICE.

SEMON J. PARDESSUS, OF BROOKLYN, NEW YORK.

IMPROVEMENT IN VENTILATOR-CAPS.

Specification forming part of Letters Patent No. 222,939, dated December 23, 1879; application filed October 14, 1879.

*To all whom it may concern:*

Be it known that I, SEMON J. PARDESSUS, of Brooklyn, in the county of Kings and State of New York, have invented a new and useful Improvement in Ventilator-Caps; and I do hereby declare that the following is a full, clear, and exact description thereof, reference being had to the accompanying drawings, forming a part of this specification, in which—

Figure 1 represents a central vertical section; Fig. 2, a side elevation; Fig. 3, a top or plan view with the cap removed; and Fig. 4, side views of the device, showing an elbow-connection.

Similar letters of reference indicate corresponding parts in the several figures.

The object of my invention is to provide an external cap or hood for chimney-flues, ventilator-pipes, or skylight-hatches in buildings, railway-cars, ships, or other vessels or structures, whereby an enlarged area of opening is secured, and a construction and relative arrangement of the cap with the pipe that induces an exhaust therein, and excludes rain, snow, or dust.

The invention consists in forming a dome-shaped cap of somewhat larger diameter at its base than the end of the ventilating-pipe, (whether flared or straight,) and affixing the same thereto so that it may be adjusted to any desired angle and the overhanging portion of the cap will project below the end of the pipe, the intermediate annular space forming the opening or outlet.

In order that others may understand and use my invention, I will proceed to describe its construction and operation, and subsequently to define in the claim its novel features.

In the drawings, *a* represents the projecting end of a ventilating-pipe leading from the interior of a building or other structure. *b* is the dome-shaped cap, secured to a short length of pipe, which is connected with an elbow, as shown in Fig. 4, to permit the adjustment of the cap to any desired angle.

In the adaptation of the cap to a railway-car or other moving structure, particularly to the sides of a car-transom, the use of this elbow permits the apex of the dome to be set in the direction of its movement or of the wind, the deflection of the wind over the exterior surface of the dome producing a current past the annular opening, which induces an exhaustion of the ventilating-pipe therethrough, and consequent removal of the confined air.

The several parts composing the device are generally made of metal; but in applying the same to a skylight hatch or well the dome may be made of glass or other transparent medium, to avoid an obstruction of the light and produce by solar heat a rarefaction of the confined air, which will materially assist its prime function.

The relative arrangement of the base of the dome with the end of the ventilating-pipe, whereby the overhanging portion of the former projects beneath the latter, is an important feature in the construction of my invention for the purpose of inducing an exhaust-current in the ventilating-pipe, and, in connection with the flared end of the latter, as shown, rain, snow, and dirt are practically excluded.

*c* represents arms or brackets for securing the cap to the end of the pipe directly, or, when a glass dome is used, these arms support a flanged annular ring, *d*, or seat for the same, substantially as shown.

Any well-known means of attachment may be used in connecting or adjusting the several parts, the glass dome being usually secured to the flanged annular ring *d* by a suitable water-tight cement.

Having thus fully described my invention, what I claim, and desire to secure by Letters Patent, is—

A deflecting-dome for a ventilating pipe or skylight, capable of adjustment to any desired angle, and having an overhanging portion projecting below the end of said pipe or skylight, the intermediate space forming an annular exhaust-opening, substantially as described.

SEMON J. PARDESSUS.

Witnesses:
 JULES HALBRAN,
 CHAS. W. FORBES.